Feb. 19, 1924.

R. WEBSTER

DIRIGIBLE HEADLIGHT

Filed Jan. 11, 1923  3 Sheets-Sheet 2

1,484,442

INVENTOR
Robert Webster
By W. W. Williamson
Atty.

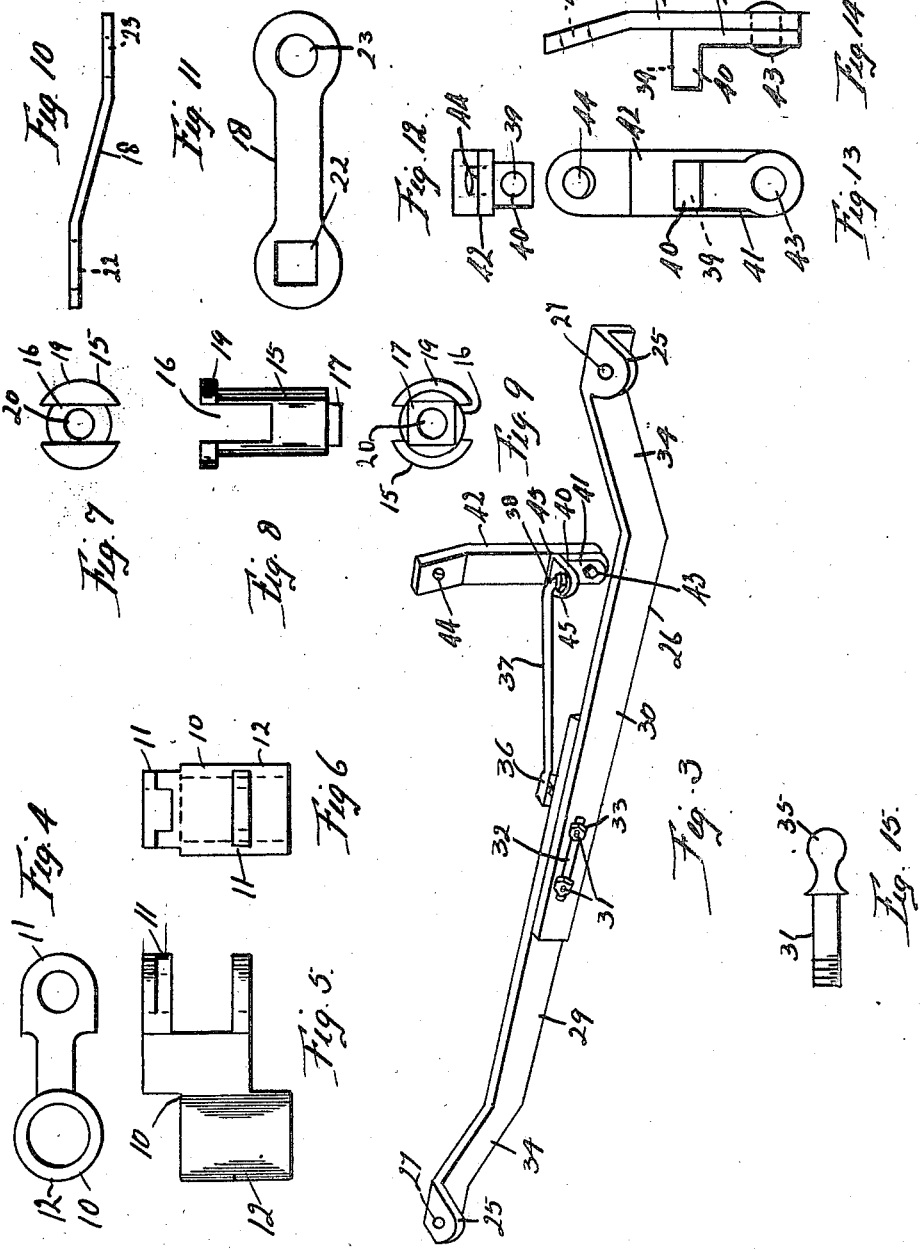

Patented Feb. 19, 1924.

1,484,442

UNITED STATES PATENT OFFICE.

ROBERT WEBSTER, OF PHILADELPHIA, PENNSYLVANIA.

DIRIGIBLE HEADLIGHT.

Application filed January 11, 1923. Serial No. 612,041.

*To all whom it may concern:*

Be it known that I, ROBERT WEBSTER, a citizen of the United States, residing at 7152 Guyer Avenue, Philadelphia, in the county of Philadelphia and State of Pennsylvania, have invented new and useful Improvements in a Dirigible Headlight, of which the following is a specification.

My invention relates to new and useful improvements in a dirigible headlight, and has for its primary object to provide a device of this general character having novel improved means whereby the headlight of a motor driven vehicle or the like will be caused to swing in unison and in the same general direction as the steering wheels during the lateral movement thereof whereby the rays of the headlight are at all times thrown in the direction of travel of the vehicle.

Another object of this invention is to provide for actuating the headlights directly from the steering column or post of the vehicle thereby eliminating to a large extent the quivering motion often resulting in devices of this character where the movement is transmitted to the lamps from parts of the running gear.

A further object of the invention is to provide a structure of this character whereby the parts of the automobile to which my invention is connected may be retained thus greatly reducing the expense of installation.

A still further object of the invention is to provide an exceedingly simple and effective construction which may be easily and quickly installed and which although light in weight will be exceedingly strong and durable.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 3, is a perspective view of the parts between the steering column and the lamp links illustrating their relation to each other.

Fig. 4, is an enlarged plan view of one of the lamp brackets.

Fig. 5, is a side elevation thereof.

Fig. 6, is an end view of the same.

Fig. 7, is an enlarged upper end view of the bushing.

Fig. 8, is a side elevation thereof.

Fig. 9, is a bottom end view of the same.

Fig. 10, is an enlarged edge view of one of the links.

Fig. 11, is a plan view thereof.

Fig. 12, is an enlarged upper end view of the hanger which is attached to the steering column.

Fig. 13, is a front elevation thereof.

Fig. 14, is an edge view of the same.

Fig. 15, is an enlarged elevation of the ball headed bolt connecting the members of the connecting bar.

Figure 1:
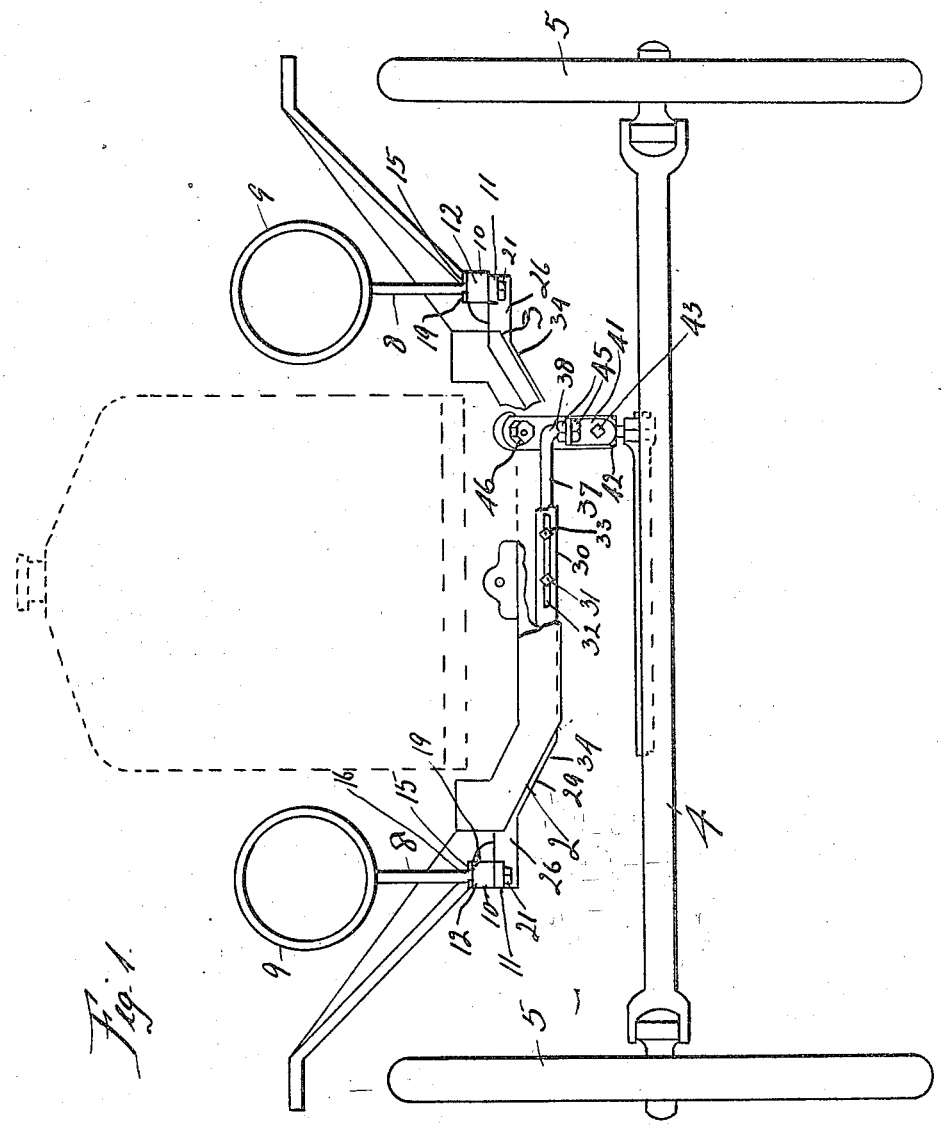
Fig. 1, is a fragmentary front elevation of an automobile showing my invention applied thereto.
Figure 2:
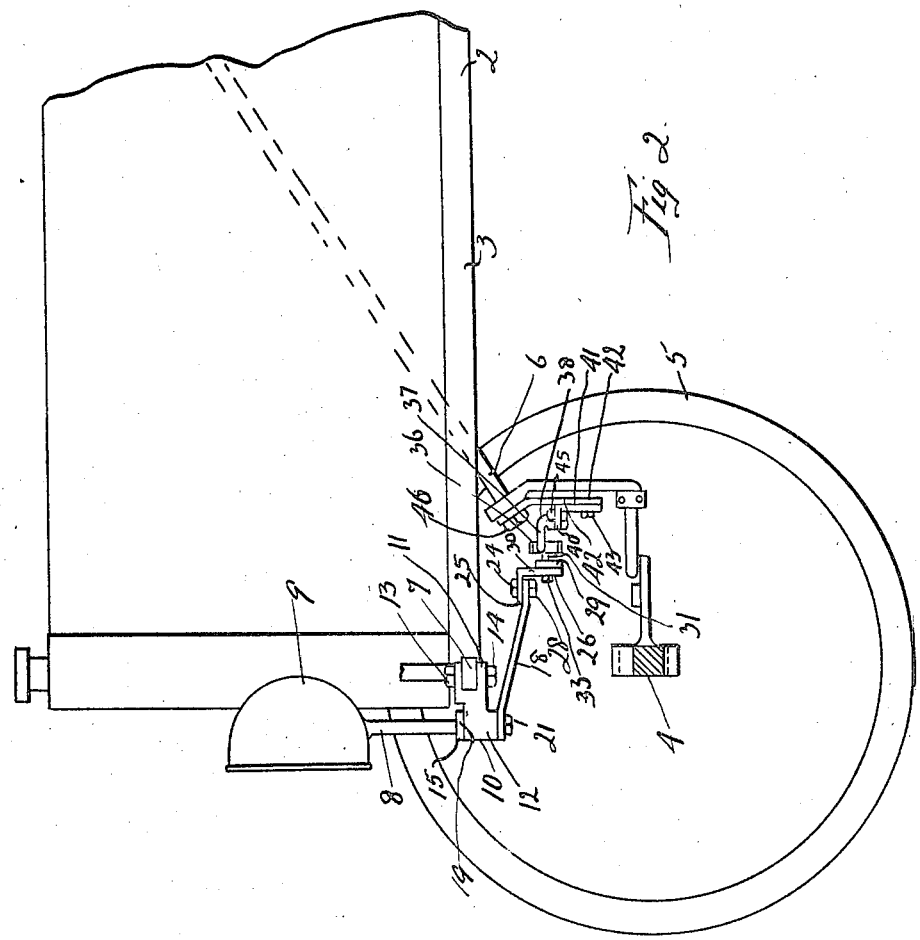
Fig. 2, is a fragmentary side elevation thereof with the fenders and near side wall removed and a portion of the steering apparatus and front axle being shown in section.

In carrying out my invention as here embodied, 2 represents a vehicle, here shown as an automobile, including a chassis or frame 3, a front axle 4, the front wheels 5 which are actuated for steering purposes in any well known manner by a mechanism of any desirable construction which includes the steering column 6.

To some suitable portion of the vehicle such as the chassis or frame are fixed the ordinary lugs or ears 7 in which the standards 8 of the headlights 9 are generally stationarily mounted and it is to each of these lugs that a bracket 10 is secured. Each bracket includes a bifurcated portion 11 to fit over the lug or ear 7 and a socket 12 for a purpose to be later described. The bracket 10 is held in place by a bolt 13 and nut 14 threaded thereon.

In the socket 12 is rotatably mounted the bushing 15 having a slotted upper end 16 to receive the flattened portion of the headlight shank and a rectangular projection 17 at its lower end which projects below the lower end of the socket 12 to receive one end of the link 18 and said bushing is prevented from dropping through the socket by means of the flange 19 at the upper end of said bushing. The bushing is also provided with a bore 20 through which the lower threaded end of the lamp standard projects, said standard having a nut 21 threaded thereon so as to hold the headlight, bushing and link in place relative to the bracket.

The rectangular projection 17 registers with a similarly shaped hole 22 in one end of the link 18 while in the other end of said link is formed a round hole 23 for the passage of a suitable bolt 24 whereby said other end of the link may be pivotally connected to one of the ears 25 of the connecting bar 26 each of said ears also having a round hole 27 for the reception of the bolt 24 which is held in place by a nut 28 secured thereon.

The connecting bar 26 comprises two members 29 and 30 adjustable lengthwise relative to each other by means of bolts 31 passing through aligning slots 32 and having nuts 33 thereon. The outer end of each of these members projects upwardly or is inclined, as indicated at 34 so that the outer ends of said connecting bar are in a higher plane than the major central portion thereof and with these ends are formed the outwardly or forwardly projecting ears 25 hereinbefore described. One of the bolts 31 has a ball head 35 for coaction with the socket member 36 on one end of the pitman 37 while the opposite end of said pitman has an extension 38 at right angles thereto for insertion in the hole 39 in the lip 40 formed with the lower end of the hanger arm 41 which is pivoted to the lower end of the hanger 42 by means of a rivet 43 or its equivalent, the upper end of said hanger being bent inward or toward the hanger arm and said bent in portion has a hole 44 therethrough. In order to rigidly attach the pitman 37 to the lip of the hanger arm nuts 45 are threaded on the extension 38 of the pitman and jammed against opposite faces of the lip 40.

The hanger 42 is placed upon the lower end of the steering column 6 by means of the hole 44 and the nut 46 ordinarily on said steering column is then screwed upon said column thus securely holding the parts in place.

In practice as the steering column is rotated for changing the direction of the front wheels 5 the hanger 42 will be moved sidewise and carry the hanger arm 41 with it but as the hanger arm is pivoted to the hanger and is rigidly connected with the pitman, the outer end of which travels in a straight line, said hanger arm will remain in a vertical position and therefore will not bind the parts so that they will freely move. This sidewise movement of the hanger will move the connecting bar 26 longitudinally and so swing the links 18 as to rotate the bushings 15 within the brackets 10 and since the headlights are fixed to the bushings said headlights will be rotated in the same direction for throwing the rays of said headlight in the direction of travel of the vehicle.

It is to be particularly noted that although certain elements are added none of the standard parts of the machine are dispensed with and since the additional parts will fit with and since the standard parts of the machine the device may be readily installed by the ordinary layman.

Of course I do not wish to be limited to the exact details of construction as herein shown as these may be varied within the limits of the appended claims without departing from the spirit of my invention

Having thus fully described my invention, what I claim as new and useful is:—

1. The combination with a vehicle including the ordinary lamp holding lugs and a steering column, of brackets attached to said lugs, bushings rotatably mounted in the brackets, a headlight mounted in each bushing to rotate therewith, a link attached to each bushing, means to hold the headlights, bushings and links in place, a connecting bar comprising two members having overlapping ends, said overlapping ends being slotted, bolts passing through said slots to hold the members in adjusted positions, nuts on said bolts, one of said bolts having a ball head, the outer ends of said members being upwardly inclined, ears projecting from said outer ends, means to pivot the other ends of the links to said ears, a hanger attached to the lower end of the steering column, an upwardly projecting arm pivoted to the lower end of the hanger and a pitman rigidly connected at one end to said arm and having a socket at the other end for connection to the ball head of bolt on the connecting bar.

2. The combination with a vehicle including the ordinary lamp holding lugs and a steering column, of brackets attached to said lugs, bushings rotatably mounted in the brackets, a headlight mounted in each bushing to rotate therewith, a link attached to each bushing, means to hold the headlights, bushings and links in place, an adjustable connecting bar pivoted to both links and carrying one element of a ball and socket joint, a hanger having an angular upper end in which is a hole to receive the lower end of the steering column, a nut threaded on said steering column to hold the hanger in place, an upwardly projecting arm pivoted to the lower end of said hanger, a lip projecting from the upper end of said arm, and a pitman rigidly connected to said lip at one end and carrying the other element of the ball and socket joint at the other end for connection with the element carried by the connecting bar.

In testimony whereof, I have hereunto affixed my signature.

ROBERT WEBSTER.